(No Model.)
J. SNAVELY.
CORN PLANTER.
No. 532,603. Patented Jan. 15, 1895.
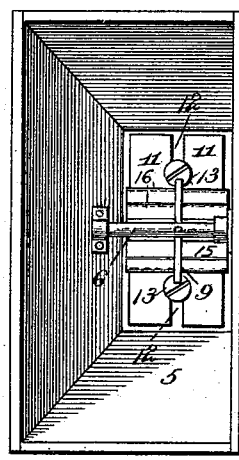
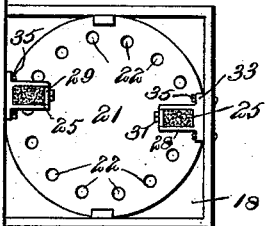
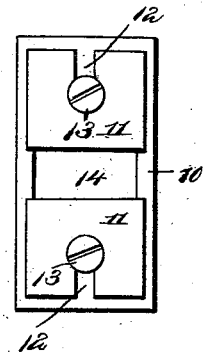
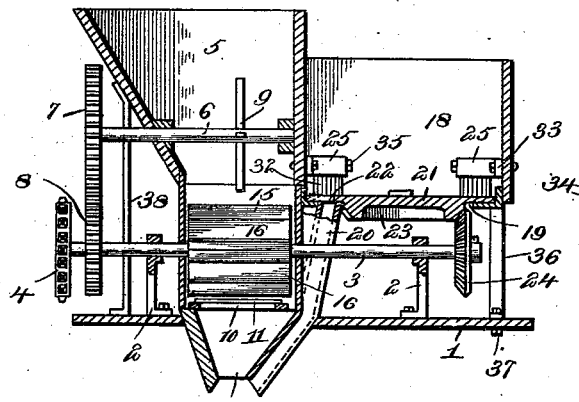
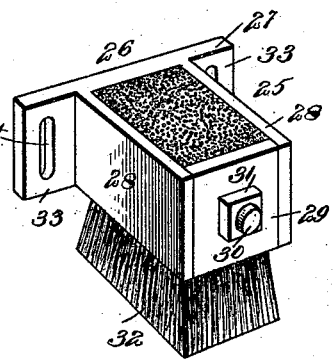
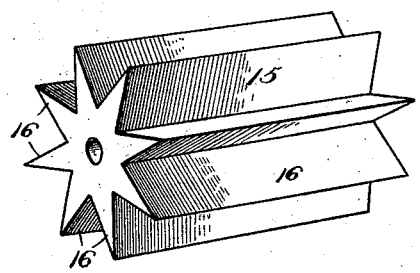
Witnesses
Inventor
John Snavely,
By his Attorneys.

UNITED STATES PATENT OFFICE.

JOHN SNAVELY, OF CENTRE HALL, PENNSYLVANIA.

CORN-PLANTER.

SPECIFICATION forming part of Letters Patent No. 532,603, dated January 15, 1895.

Application filed November 7, 1893. Serial No. 490,314. (No model.)

*To all whom it may concern:*

Be it known that I, JOHN SNAVELY, of Centre Hall, county of Centre, and State of Pennsylvania, have invented certain new and useful Improvements in Corn-Planters, of which the following is a specification.

My invention relates to planting mechanism, and has for its object to provide means for planting corn or similar seed and the desired amount of fertilizer simultaneously, the seed and fertilizer feeding devices being operated by the same mechanism; and to provide means whereby the regular distribution of the fertilizer is insured, even when said fertilizer is of rough or bulky character.

Further objects and advantages of the invention will appear in the following description, and the novel features thereof will be particularly pointed out in the appended claim.

In the drawings:—Figure 1 is a plan view of a planting mechanism embodying my invention. Fig. 2 is a central section of the same taken parallel with and in the plane of the axis of the driving-shaft. Fig. 3 is a plan view of the floor of the fertilizer-box to show the means for regulating the size of the opening therein. Fig. 4 is a detail view in perspective of the fertilizer pulverizing and feeding wheel. Fig. 5 is a detail view of one of the brushes employed for removing the surplus grain from the perforations of the seed-disk.

Similar numerals of reference indicate corresponding parts in all the figures of the drawings.

1 designates a base, which is adapted to be secured to the framework of a planter, and 2 represents standards uprising from said base and provided in their upper ends with bearings for the driving-shaft 3. This driving-shaft operates above the planting and fertilizer distributing devices, and receives power from a suitable source through a chain-wheel 4, which is fixed to one extremity thereof.

5 represents a fertilizer-box, in the sides of which is mounted a counter or agitator-shaft 6 provided at its outer end with a gear 7 which meshes with a similar gear 8 upon the driving-shaft. This counter or agitator-shaft carries an agitator 9 having radial arms for preventing the packing of the fertilizer in the receptacle.

The floor of the fertilizer-box, shown in plan in Fig. 3, consists of a frame 10, upon which are mounted the adjustable slides 11 provided with slots 12 for the reception of locking screws 13, said slides being adjustable toward and from the center of the box to vary the feed-opening 14 between their adjacent edges. Secured to the driving-shaft and operating at its lower side in said feed opening or between the adjacent edges of the slides 11 is a fertilizer pulverizing and feeding-wheel 15, the length of which is equal to the width of the fertilizer-box. This wheel 15 is star-shaped in cross-section, being provided with the radial outwardly tapered wings 16 between which the fertilizing material is caught and carried to the feed opening 14. The rotation of this wheel in the bottom of the fertilizer-box and the shape of the wings thereof insure the proper crushing and pulverizing of the fertilizing material. Below the feed-opening 14 is located a chute 17, which tapers toward its lower end to prevent scattering of the fertilizer and insure its deposition at the proper time.

Adjacent to the fertilizer box 5 is a seed-box 18, provided in its floor with a feed-opening 19, with which communicates a tubular seed-chute 20, and operating in a central opening in said floor is the rotary seed-disk 21 provided with a series of gage-openings 22, either of which is adapted to register with the floor-opening in the floor of the seed-box. Depending from this seed-disk is a ring 23 provided with exterior beveled gear-teeth, with which mesh the teeth of the beveled pinion 24 carried by the driving shaft 3. Located in the seed-box respectively over the feed-opening 19 and at the diametrically opposite side thereof are the cut-off brushes 25, which have holders or frames 26 for securing them to the sides of the seed-box. Each holder consists of a base-plate 27 and the parallel cheek-plates 28, between which operates a follower 29 secured in place by means of a bolt 30 engaged by a nut 31. The bristles 32 are arranged between the base-plate and the parallel cheek-plates, and are properly bunched and compressed at their upper ends by means of the follower-plate, as will be understood. The base-plate is extended laterally beyond the outer surfaces of the cheek-plates 28 to form the ears 33 provided with vertical slots 34 for engagement with suitable bolts 35, whereby the holders may be attached to the walls of the seed-box. By means of the bolts 35 and co-acting slots 34 the holders and hence the brushes may be vertically adjusted to compensate for wear and insure the necessary pressure upon the surface of the seed-disk.

The seed-box is supported by means of standards 36 provided with central perforations or bores, through which extend the bolts 37, which are engaged at their lower extremities with the base-plate, and suitable braces 38 are provided to support the fertilizer-box in the desired position, said braces being attached at their upper extremities to the outer wall of the fertilizer-box and at their lower extremities to the base-plate.

From the above description the operation of the improved mechanism will be readily understood, and it will be obvious that the advantage secured by the use of twin cut-off brushes is that in case two or more seeds become engaged edgewise in one of the perforations of the seed-disk they will be dislodged by the brush opposite to that which is located adjacent to the feed-opening, thus allowing time for the proper arrangement of a seed or seeds in the said perforations before it reaches the feed-opening, while when a single cut-off brush is employed the dislodgment of improperly seated grain causes the perforation in which they have been seated to pass the feed-opening before it can receive another supply.

It will be obvious from the above description, furthermore, that both the fertilizer pulverizing and distributing devices and the seed-disk receive their motion from a common shaft, thus avoiding the duplication of mechanism and providing for a uniformity of operation as well as simplicity of construction.

Various changes in the form, proportion, and the minor details of construction may be resorted to without departing from the spirit of the invention or sacrificing any of the advantages thereof.

Having described my invention, what I claim is—

In a machine of the class described, the combination of a fertilizer-box, a contiguous seed-box, means for adjusting the size of the feed-opening in the floor of the fertilizer-box, consisting of slides 11, having longitudinal slots 12, and stationary set-screws 13 engaging the slots, a chute located below and communicating with the feed-opening in the fertilizer-box, a fertilizer pulverizing and distributing wheel 15 located in the fertilizer-box with its lower side arranged in the feed-opening thereof, said wheel being star-shaped in cross-section and having continuous outwardly tapered radial wings 16, seed-feeding devices, and means for operating the same, substantially as specified.

JOHN SNAVELY.

Witnesses:
F. M. CRAWFORD,
J. WITMER WOLF.